Patented Oct. 5, 1943

2,331,094

UNITED STATES PATENT OFFICE 2,331,094

PREPARATION OF ESTERS

Donald J. Loder, Wilmington, Del., assignor to E. I. du Pont de Nemours & Company, Wilmington, Del., a corporation of Delaware No Drawing. Application November 23, 1940, Serial No. 366,880

6 Claims. (Cl. 260—484)

This invention relates to a process for the preparation of esters and primarily for the preparation of esters of hydroxyacetic acid.

An object of the present invention is to provide a process for the esterification of hydroxyacetic acid, wherein part or all of the water of esterification is removed prior to esterification. A further object of the invention is to provide a process wherein hydroxyacetic acid, from which the free and a substantial portion of the combined water has been withdrawn, is esterified under superatmospheric pressures. Other objects and advantages of the invention will hereinafter appear.

Due to the bifunctional nature of hydroxyacetic acid, several types of products can result from its dehydration, for example, the elimination of 1 mole of water from the alcoholic hydroxyl groups of 2 moles of the acid gives diglycolic acid, which may further lose water to form a ring compound, diglycolic anhydride. The elimination of 1 mole of water from the carboxyl groups of 2 moles of the acid gives hydroxyacetic anhydride, and of 2 moles of water from 2 moles of the acid by esterification of the hydroxyl groups with the carboxyl groups, a ring compound, 2,5-diketo-1,4-dioxane or diglycolide. Furthermore, the carboxyl groups of 1 mole of the acid may react with the hydroxyl groups of another mole of the acid with elimination of 1 mole of water to give hydroxyacetoxyacetic acid. The latter compound may further react with more hydroxyacetic acid or with itself by esterification of carboxyl groups and/or hydroxyl groups with hydroxyl groups and/or carboxyl groups to give a simple polyester. The latter process may be repeated consecutively, the carboxyl group of a low molecular weight polyester reacting with the hydroxyl group of hydroxyacetic acid or a low molecular weight polyester therefrom, and so on, until a long chain linear polyester is formed. In the same manner two or more low molecular weight polyester molecules can react to form higher molecular weight polyesters. Finally, at any point in the formation of the polyester the carboxyl group at one end of said polyester may esterify the hydroxyl group at the other end to form a large ring compound. The elimination of water, therefore, from hydroxyacetic acid may produce, as is evidenced by the above reactions, a number of compounds dependent upon the manner in which the elements of water unite under the random conditions of molecular orientation prevalent in the reaction mixture. Dehydrated hydroxyacetic acid may contain the above types of reaction products in varying proportions.

It has been found that if hydroxyacetic acid is thus dehydrated, and then subjected to esterification, good yields of the ester will result, the rate of the reaction is considerably greater than that of the undehydrated hydroxyacetic acid and the throughput of a given apparatus considerably augmented. These advantages have particular significance when the reaction is conducted under pressure inasmuch as the greater conversion of ester at equilibrium makes it possible in a batch or continuous process to obtain considerably greater capacity from a given equipment.

Moreover, it has been found that it is very difficult to remove water from an ester of glycolic acid and in addition a partially dehydrated glycolic acid is less corrosive than the aqueous acid.

Furthermore, it has been found desirable to remove as much of the free and combined water as possible from the acid before mixing it with the alcohol, not only in order to decrease the quantity of materials to be handled, but also to shift the equilibrium of the esterification reaction as far as possible toward the alkyl hydroxyacetate.

While it appears that a small change in the amount of dehydration does not appreciably effect the results, on the other hand, too great an amount of dehydration introduces handling difficulties, if continuous operation is contemplated, due to the solidification of the polymers. Dehydration to a calculated acidity between 104% and 113% has been found to give satisfactory results with dehydration to 110% acid as the recommended value for esterification by a continuous process. It is further advisable when using the dehydrated acid above 106% to keep it above approximately 75° C. until the alcohol has been added when it may be cooled to around 45° C. if desired. Nevertheless, if the esterification is effected by a batch process, fully dehydrated acid may be used and the esterification effected between the alcohol and the molten dehydrated acid, such reactions being conducted under elevated pressures; this method will be more fully described hereinafter.

Preferably, the alcohol is added to the partially dehydrated acid in a closed vessel, the resulting mixture preheated to a temperature between 200 and 230° C. and held at the selected temperature for from 10 to 60 minutes, the pressure being maintained during esterification at between 200 and 1,000 pounds per square inch, or, if desired, autogenous pressures may be employed. Lower temperatures may be used, say down to 100° C.

or lower with a somewhat lower reaction rate. If high boiling alcohols are employed, such as ethylene glycol and glycerine, elevated pressure need not be used. The pressure is then rapidly released, whereupon the unconverted alcohol is flashed off, and the ester recovered by fractional distillation. If it be desired to speed up the reaction, esterification catalysts such as sulfuric acid, hydrochloric acid, and the like may be used, but the reaction proceeds satisfactorily under the conditions given without a catalyst.

If the dehydration of the hydroxyacetic acid is continued until a polyglycolide is made containing substantially no free or combined water, the reaction conditions differ somewhat from those used for treatment of the partially dehydrated acid. Glycolide is, at room temperatures, a hard solid, but when the temperature is raised to in the neighborhood of 215° C. it is converted to the molten state. In this state, it has been found that the glycolide can be esterified directly with an alcohol in the presence or in the absence of an esterification catalyst. In the reaction of the fully dehydrated acid, it has been found advantageous to conduct the esterification under pressures in excess of atmospheric and generally at pressures ranging between 100 and 5,000 pounds per square inch may be employed.

The alcohol is added preferably in stoichiometrical excess up to approximately 1.4 moles thereof per mole of the partially or completely dehydrated acid. Any alcohol may be used in the esterification, such, for example, as methanol, ethanol, n- and iso-propanol, n- and iso-butanol, octanol, and higher straight and branched chain alcohols as well as the mixtures or particular fractions of the mixtures of alcohols obtained by the hydrogenation of carbon oxides and mixtures of alcohols obtained from olefines, aromatic alcohols such as benzyl alcohol, polyhydric alcohols such as glycol, glycerol, etc., as well as the unsaturated alcohols such as oleyl alcohol, allyl alcohol and the like.

While this invention is primarily directed to esterification of the partially or fully dehydrated hydroxyacetic acid, it may likewise be used for converting one ester to another by so-called alcoholysis. When so employed the initial heating (in this case, of an ester of hydroxyacetic acid) removes alcohol and not water and the subsequent treatment with an alcohol is alcoholysis rather than esterification. If, however, an ester is heated for a considerable period of time a glycolide will result and, in effect, its treatment with an alcohol would then be strictly esterification.

Examples will now be given illustrating preferred embodiments of the invention. Parts are by weight unless otherwise indicated.

*Example 1.*—Hydroxyacetic acid was dehydrated at a temperature between approximately 180 and 200° C. until an acid was obtained which analyzed approximately 110% hydroxyacetic acid. The resulting dehydrated acid was contacted with methanol in the ratio of 1.3 moles of methanol per mole of the dehydrated acid at a temperature of 210° C. and under a pressure of approximately 500 pounds per square inch, the time of contact being approximately 15 minutes. Methyl hydroxyacetate was recovered by distillation from the crude reaction product in a yield of approximately 68%.

*Example 2.*—Hydroxyacetic acid was dehydrated by distillation under atmospheric pressure and at a temperature of approximately 180° C. to give a 110% acid (calculated as hydroxyacetic acid). This product together with isobutanol in the ratio of approximately 1.3 moles of isobutanol per mole of the dehydrated acid was charged at the rate of 30 pounds per hour into a falling film converter, such as is described in the copending application of F. W. Pardee, S. N. 301,190, filed October 25, 1939, wherein the pressure was maintained at approximately 500 pounds per square inch and the temperature at approximately 225° C. The time of contact in the converter was in the order of 10 minutes and there was recovered from the crude reaction product isobutyl hydroxyacetate in a yield of approximately 67%.

*Example 3.*—Hydroxyacetic acid was dehydrated by distillation under atmospheric pressure to give an acid of between 110 and 115% calculated as hydroxyacetic acid and the remainder of the water was then removed by distillation under a pressure of approximately 100 mm. of mercury and at a temperature of 220° C. during a period of approximately one hour. The resulting dehydrated acid was heated in an autoclave to the molten state and at approximately 210° C. methanol was forced in to give 1.3 moles of methanol per mole of the acid. Under a pressure of approximately 500 pounds per square inch, the reaction was continued for approximately 20 minutes. The esterified product, which contained less than 0.3% water, consisted of better than 60% methyl hydroxyacetate.

As has been indicated, esterification catalysts may be employed when the esters are obtained by direct esterification of the partially or fully dehydrated hydroxyacetic acid, while if the esters are obtained by alcoholysis, catalysts such as the alkali metal and alkaline earth metal algoxides may be employed.

I claim:

1. A process for the preparation of methyl hydroxyacetate which comprises dehydrating hydroxyacetic acid until it analyzes between 104% and 110% hydroxyacetic acid, preparing a mixture consisting of the thus dehydrated acid with a stoichiometric excess of methanol, and effecting the esterification at a pressure between 200 and 1,000 pounds per square inch and at a temperature between 200 and 230° C.

2. A process for the preparation of methyl hydroxyacetate which comprises dehydrating hydroxyacetic acid until it analyzes approximately 110% hydroxyacetic acid, preparing a mixture consisting of the thus dehydrated acid with a stoichiometrical excess of methanol, but not more than 1.4 moles of methanol per mole of the dehydrated acid, and subsequently reacting the resulting mixture at a temperature between 200 and 230° C. and under a pressure between 200 and 1,000 pounds per square inch.

3. A process for the preparation of methyl hydroxyacetate which comprises dehydrating hydroxyacetic acid until it analyzes approximately 110% hydroxyacetic acid, preparing a mixture consisting of the thus dehydrated acid with methanol in the ratio of 1.3 moles of methanol per mole of the dehydrated acid and subsequently reacting the resulting mixture at a temperature of 210° C. and under a pressure of 500 pounds per square inch.

4. A process for the preparation of isobutyl hydroxyacetate which comprises dehydrating hydroxyacetic acid until it analyzes approximately 110% hydroxyacetic acid, preparing a mixture consisting of the thus dehydrated acid with a stoichiometrical excess of isobutanol but not more than 1.4 moles of isobutanol per mole of the dehydrated acid and subsequently reacting the resulting mixture at a temperature between 200 and 230° C. and under a pressure between 200 and 1,000 pounds per square inch.

5. A process for the preparation of ethyl hydroxyacetate which comprises dehydrating hydroxyacetic acid until it analyzes approximately 110% hydroxyacetic acid, preparing a mixture consisting of the thus dehydrated acid with a stoichiometric excess of ethanol, but not more than 1.4 moles of ethanol per mole of the dehydrated acid, and subsequently reacting the resulting mixture at a temperature between 200 and 230° C. and under a pressure between 200 and 1,000 pounds per square inch.

6. A process for the preparation of an alkyl hydroxyacetate which comprises dehydrating hydroxyacetic acid until it analyzes between approximately 104 and 113% hydroxyacetic acid, preparing a mixture consisting of the thus dehydrated acid with a stoichiometrical excess of an alcohol, and subsequently reacting the resulting mixture at a temperature between 200 and 230° C. and under a pressure between 100 and 5000 pounds per square inch.

DONALD J. LODER.